US008010734B2

(12) United States Patent  (10) Patent No.: US 8,010,734 B2
Gong                      (45) Date of Patent:     Aug. 30, 2011

(54) METHOD AND SYSTEM FOR READING INSTRUCTIONS FROM NAND FLASH MEMORY AND WRITING THEM INTO SRAM FOR EXECUTION BY A PROCESSING DEVICE

(75) Inventor: Zhijun Gong, Iselin, NJ (US)

(73) Assignee: Broadcom Corporation

( * ) Notice: Subject to any disclaimer, the term of this patent is extended or adjusted under 35 U.S.C. 154(b) by 1400 days.

(21) Appl. No.: 10/875,000

(22) Filed: Jun. 22, 2004

(65) Prior Publication Data

US 2005/0273589 A1   Dec. 8, 2005

Related U.S. Application Data

(60) Provisional application No. 60/577,372, filed on Jun. 4, 2004.

(51) Int. Cl.
G06F 12/00 (2006.01)
(52) U.S. Cl. .......................................... 711/100; 711/103
(58) Field of Classification Search .................. 711/103, 711/100
See application file for complete search history.

(56) References Cited

U.S. PATENT DOCUMENTS

| 6,026,465 A * | 2/2000 | Mills et al. ..................... 711/103 |
| 6,988,163 B2 * | 1/2006 | Malueg et al. ................. 711/103 |
| 2002/0138710 A1 * | 9/2002 | Sih et al. ......................... 712/33 |
| 2003/0163656 A1 * | 8/2003 | Ganton ........................... 711/154 |
| 2003/0177129 A1 * | 9/2003 | Bond et al. ..................... 707/100 |
| 2004/0030824 A1 * | 2/2004 | Krauss .......................... 711/103 |
| 2004/0268116 A1 * | 12/2004 | Vasisht et al. ................. 713/100 |
| 2005/0015582 A1 * | 1/2005 | Shida et al. ......................... 713/2 |
| 2005/0132179 A1 * | 6/2005 | Glaum et al. ....................... 713/1 |
| 2006/0041711 A1 * | 2/2006 | Miura et al. .................. 711/103 |

OTHER PUBLICATIONS

Microsoft Computer Dictionary, Fifth Edition (p. 315), 2002, Microsoft Corporation.*

* cited by examiner

Primary Examiner — Hashem Farrokh

(74) Attorney, Agent, or Firm — McAndrews, Held & Malloy, Ltd.

(57) ABSTRACT

A method and system is provided for efficient execution of code in memory by a processing device and may comprise determining whether a first type of memory is present. If the first type of memory is present, at least a portion of code stored in the first type of memory may be copied to a second type of memory and executed in the latter. The first type of memory may be NAND flash memory and the second type of memory may be SDRAM. A loader image may be copied from the first type of memory to an instruction memory and a jump made to the entry of the copied loader image. Code for the loader image may then be executed. Vectors may also be copied from the first type of memory to the instruction memory and mapped to a startup address.

29 Claims, 3 Drawing Sheets

METHOD AND SYSTEM FOR READING INSTRUCTIONS FROM NAND FLASH MEMORY AND WRITING THEM INTO SRAM FOR EXECUTION BY A PROCESSING DEVICE

CROSS-REFERENCE TO RELATED APPLICATIONS/INCORPORATION BY REFERENCE

This application makes reference to, claims priority to and claims the benefit of U.S. Provisional Application No. 60/577,372.

The above referenced application is hereby incorporated herein by reference in its entirety.

FIELD OF THE INVENTION

Certain embodiments of the invention relate to processing of digitized information. More specifically, certain embodiments of the invention relate to a method and system for reading instructions from NAND flash memory and writing them into SRAM for execution by a processing device.

BACKGROUND OF THE INVENTION

A flash device is essentially an electrically erasable programmable read only memory (EEPROM or $E^2$PROM), which allow blocks of data to be programmed or erased at relatively high operating speeds. A flash differs from an EEPROM in that a flash is generally adapted to operate on blocks of data while an EEPROM or $E^2$PROM has to be erased all at once, even though the EEPROM may be programmed on a byte-by-byte basis.

Today, NAND flash and NOR flash memory devices dominate the non-volatile flash memory market. A NAND flash memory is a non-linear addressed device requiring multiplexed input/output (I/O) pins for handling both data and commands. A NAND flash memory device is a serially interfaced device in which address, data, and control information are multiplexed on the same pins. As a result of its serial interface, the NAND flash memory device requires more complex and extensive I/O interfaces and drivers for handling the multiplexed I/O pins. A NAND flash memory device is typically accessed in bursts, thereby permitting, for example, 512 bytes of data to be written to or read from the device. However, random access errors generated by physical defects in the geometry of the NAND gates results in low reliability for NAND flash memory devices.

A NOR flash device is a linear addressed device, which comprises separate address and data lines. In this regard, a NOR flash device is somewhat similar to a dynamic random access memory (DRAM) device. A NOR flash memory generally comprises sufficient address pins that allows it to be memory mapped into a processor's address space, thereby allowing the NOR flash to be accessed like a read only memory (ROM). The cell structure of NAND flash is almost one-half the size of a NOR flash's cell structure and as a result, for a given die, NAND flash memory devices have a much higher packing density than NOR flash memory devices. For example, NOR flash capacities range from 1 megabyte (MB) to 4 MBs while NAND flash capacities range from 32 MBs to 512 MBs. In addition to its higher packing density and thus higher capacity, NAND flash is cheaper than NOR flash since it is much cheaper to produce. NOR flash memory devices also possess less than 10% of the lifespan of NAND flash memory devices.

Given today's trends in wireless communication technologies, consumer demand is constantly forcing device manufactures to create access devices such as handhelds, which store more data using less chip real estate at significantly lower costs. A NAND flash memory is typically utilized in cell phones because of its low cost and low power consumption compared with traditional NOR flash memory. In cellular telephones (cell phones) and personal digital assistant (PDA) type devices, for example, NAND flash may be utilized to store digitized images and data. In some instances, NAND flash memory devices may also be utilized to store computer instructions or code, which is to be executed by one or more processors in an access device such as a cellular telephone or PDA. Although NAND flash possesses much higher bit densities, is inexpensive, and has much lower power consumption than NOR flash, it also has a very low reliability due to bad blocks and prolonged access time. These issues of reliability and access time make it more difficult to execute the computer instructions directly from the NAND flash. NOR flash is not suitable for execution of instructions because of its small capacity and shorter lifespan.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for reading instructions from NAND flash memory and writing them into SRAM for execution by a processing device. Aspects of the method may provide efficient execution of code in memory by a processing device and may comprise determining whether a first type of memory is present. If the first type of memory is present, at least a portion of code stored in the first type of memory may be copied to a second type of memory and executed in the second type of memory. In an illustrative embodiment of the invention, the first type of memory may be NAND flash memory and the second type of memory may be SDRAM.

A loader image may be copied from the first type of memory to an instruction memory and a jump may be made to the entry of the copied loader image in the instruction memory. Code for the loader image may then be executed. Vectors may also be copied from the first type of memory to the instruction memory and the vectors may be mapped to a startup address. Moreover, system parameters may also be copied to the second type of memory.

Another embodiment of the invention may provide a machine-readable storage, having stored thereon, a computer program having at least one code section executable by a machine, thereby causing the machine to perform the steps as described above in the method for efficient execution of code in memory by a processing device.

Aspects of the system may provide efficient execution of code in memory by a processing device and may comprise a processor that is adapted to determine whether a first type of memory is present. If the first type of memory is present, at least a portion of code stored in the first type of memory may be copied by the processor to a second type of memory. The processor may execute the code in the second type of memory. In an exemplary embodiment of the invention, the first type of memory may be NAND flash memory and the second type of memory may be SDRAM.

The processor may be adapted to copy a loader image from the first type of memory to an instruction memory and a jump may be made to the entry of the copied loader image in the instruction memory. Accordingly, code for the loader image may then be executed by the processor. The processor may also be adapted to copy vectors from the first type of memory to the instruction memory and the copied vectors may be mapped to a startup address. The processor may then copy system parameters to the second type of memory, for example, the SDRAM.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention provide a method and system for reading instructions from NAND flash memory and writing them into SRAM for execution by a processing device. In accordance with an embodiment of the invention, computer instructions may be stored in NAND flash memory and may be copied to a random access memory such as a SDRAM. Once the computer instructions are copied to the random access memory, the instructions may be executed from the SDRAM rather from the NAND flash.

Figure 1:
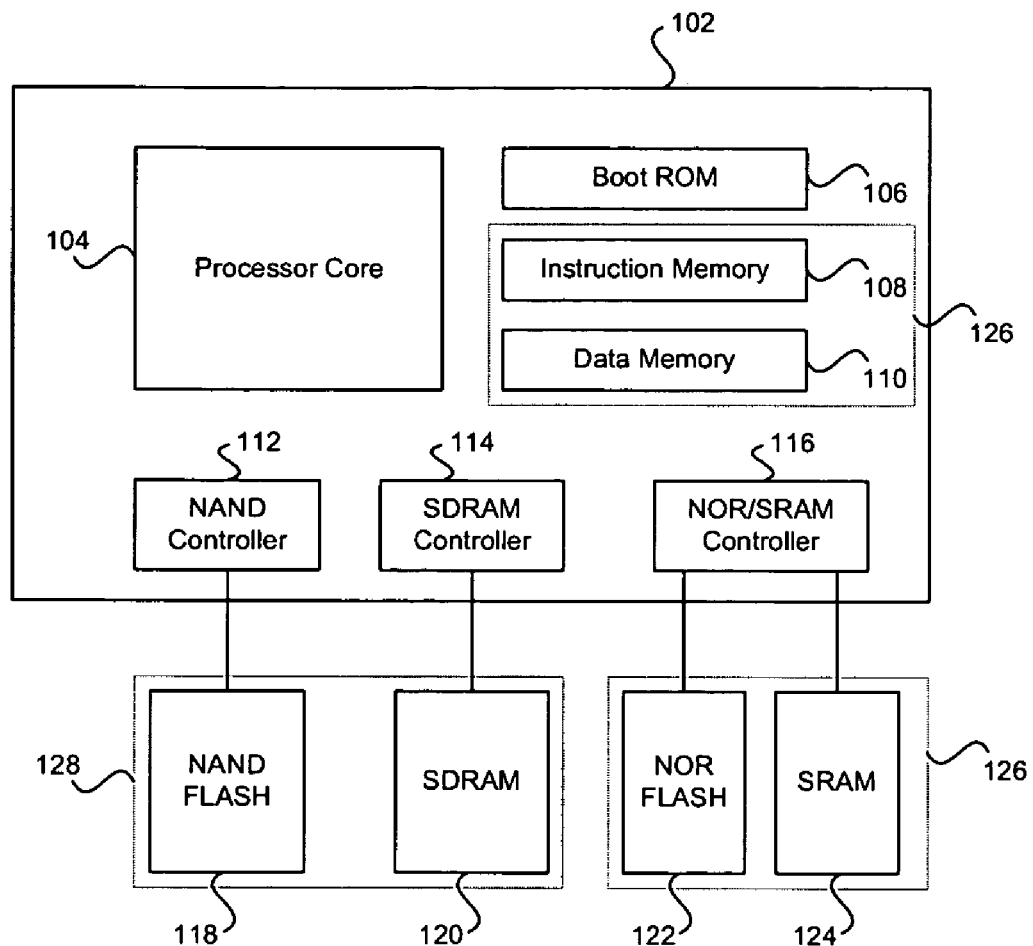
FIG. 1 is a block diagram of an exemplary system for reading instructions from a NAND flash memory and writing them into SRAM for execution by a processing device, in accordance with an embodiment of the invention.

FIG. 1 is a block diagram of an exemplary system for reading instructions from a NAND flash memory and writing them into SRAM for execution by a processing device, in accordance with an embodiment of the invention. Referring to FIG. 1, there is shown an integrated current (IC) 102 coupled to a first memory block 128 and a second memory block 126. The integrated circuit 102 comprises a processor core 104, a boot ROM 106, memory block 126, a NAND flash controller block 112, a SDRAM controller block 114 and a NOR/SRAM controller block 116. The memory block 126 comprises an instruction memory block 108 and a data memory block 110. The memory block 126 may be a static random access memory (SRAM) block.

The first memory block 128 may comprise a NAND flash memory block 118 and a SDRAM block 120. The NAND flash memory block 118 may be coupled to the NAND flash controller block 112. The SDRAM block 120 may be coupled to the SDRAM controller block 114. The second memory block 126 may comprise a NOR flash memory block 122 and a SRAM block 124. The NOR flash block 122 and the SRAM block 124 may be controlled by a single controller, namely NOR/SRAM controller block 116. Although the NOR flash block 122 and the SRAM block 124 are shown coupled to a single controller 116, the invention is not so limited. Accordingly, a separate NOR flash controller may be utilized to control NOR flash block 122 and a separate SRAM controller may be utilized to control the SRAM block 124. Similarly, a single integrated NAND/SDRAM controller may be utilized to control the NAND flash block 118 and the SDRAM block 120.

Figure 2:
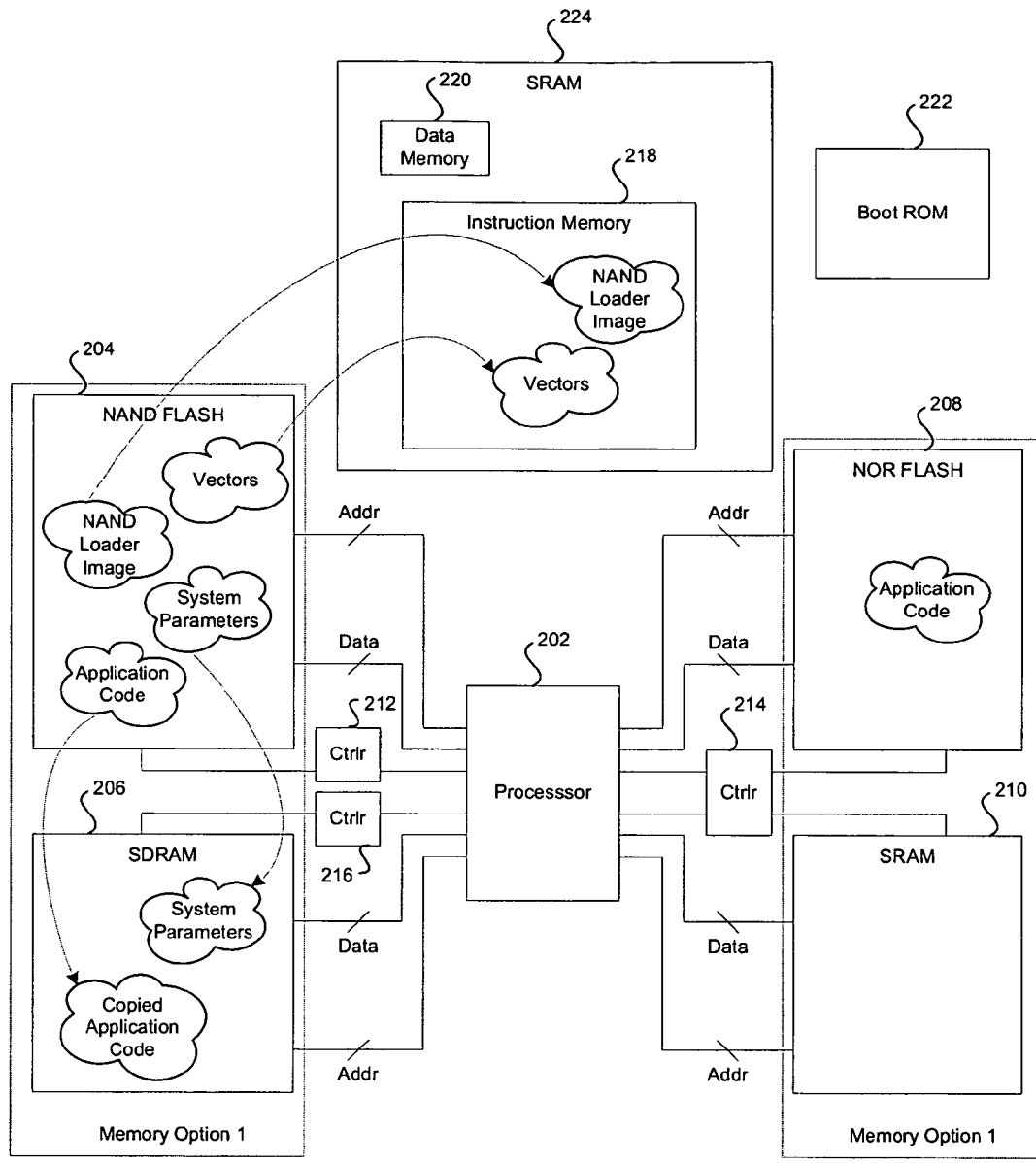
FIG. 2 is a block diagram illustrating reading of instructions from NAND flash memory and writing them into SRAM for execution by a processing device, in accordance with an embodiment of the invention.

FIG. 2 is a block diagram illustrating reading of instructions from NAND flash memory and writing them into SRAM for execution by a processing device, in accordance with an embodiment of the invention. Referring to FIG. 2, there is shown a processor 202, memory such as SRAM 224, boot ROM 222, NAND Flash 204, SDRAM 206, NOR flash 208, SRAM 210 and memory controllers 212, 214, 216.

The memory 224 may be integrated on-chip and may comprise data memory 220 and instruction memory 218. The memory 224 may be integrated within an integrated circuit or chip 102. Information stored in the NAND flash memory 204 may comprise system parameters, a NAND loader image, vectors and application code. The NOR flash 208 may be utilized to store application code.

The memory controllers 212, 214, may be coupled to processor 202 and the NAND flash 204 and SDRAM 206. Memory controller 214 may be configured to control both NOR flash 208 and SRAM 210.

In operation, whenever the NAND flash 204 is detected, the NAND loader image may be copied from the NAND flash 204 to the instruction memory 218. Code for the NAND loader image may be executed by the processor 202 and utilized to copy the application code to the SDRAM 206. The processor 202 may also copy vectors to the instruction memory 218 and copy system parameters the SDRAM 206.

Figure 3:
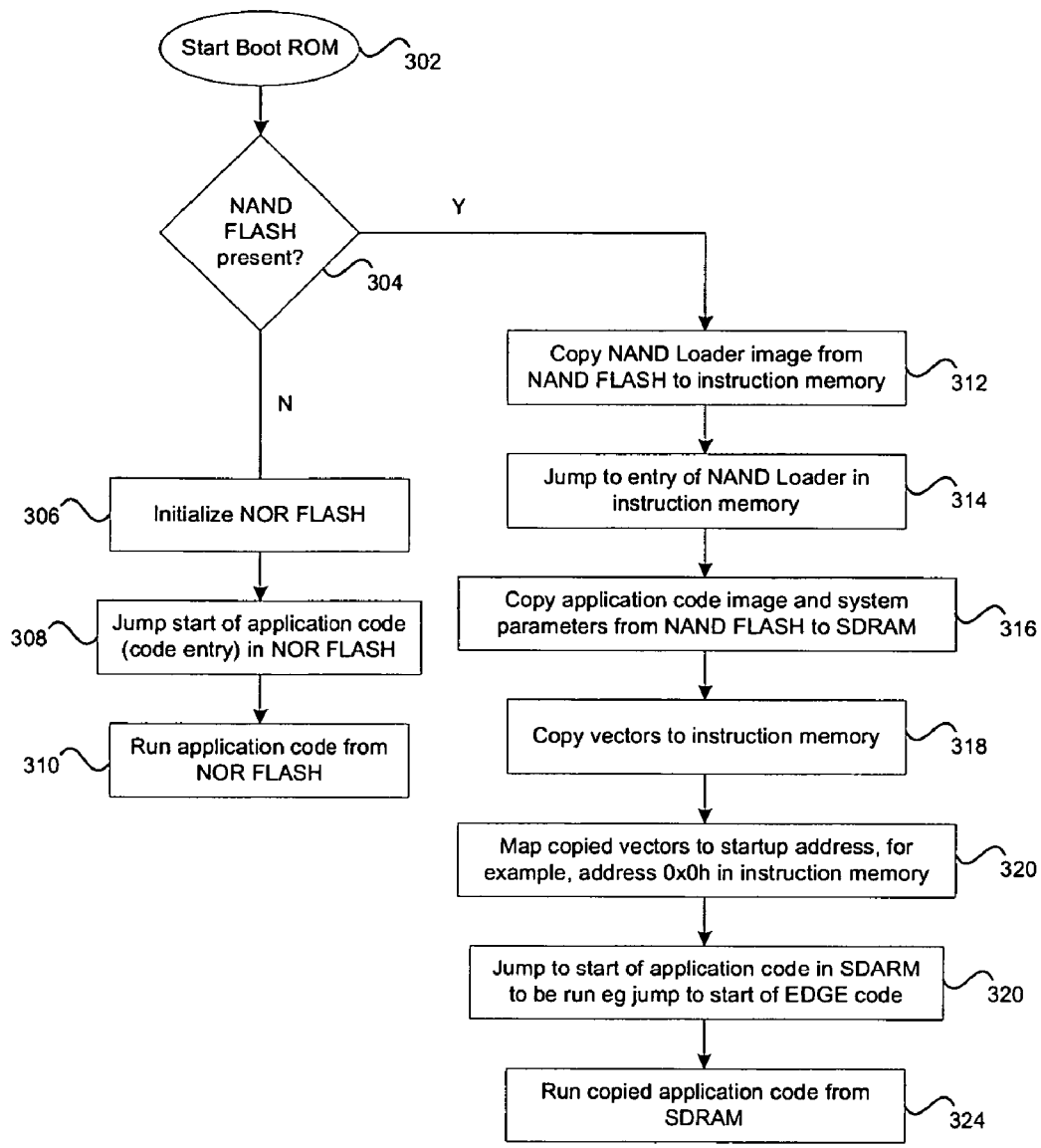
FIG. 3 is a flow chart illustrating exemplary steps for reading instructions from NAND flash memory and writing then into SRAM for execution by a processing device, in accordance with an embodiment of the invention.

FIG. 3 is a flow chart illustrating exemplary steps for reading instructions from NAND flash memory and writing them into SRAM for execution by a processing device, in accordance with an embodiment of the invention. Referring to FIG. 3, in step 302, the boot read-only memory (ROM) is started. In step 304, a determination is made regarding whether a NAND flash is present. If it is determined that there is no NAND flash present, then in step 306, the NOR flash is initialized. In step 308, a jump may be made to the start code entry of the application code in NOR flash. In step 310, the application code is run or executed from the NOR flash.

In step 304, if it is determined that the NAND flash is present, then in step 312, NAND loader image may be copied from NAND flash to instruction memory. In step 312, a jump is made to the entry of NAND loader image in instruction memory. In step 316, application code image and/or system parameters may be copied from NAND flash to SDRAM. In step 318, vectors may be copied to instruction memory. In step 320, the copied vectors may be mapped to the startup address, for example, address 0x0h in the instruction memory. In step 322, a jump may be made to the start of the application code in SDRAM. In step 324, the copied application code may be run from SDRAM.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for efficient execution of code in memory by a processing device, the method comprising:
   determining whether a first type of memory is present;
   if said first type of memory is present, copying a loader image stored in said first type of memory to instruction memory;
   executing said copied loader image to copy application code from said first type of memory to a second type of memory; and
   executing said copied application code from said second type of memory, wherein said instruction memory, which stores said copied loader image, is separate from said first type of memory, which stores said loader image and said application code, and said second type of memory.

2. The method according to claim 1, wherein said first type of memory is a NAND flash memory.

3. The method according to claim 1, wherein said second type of memory is an SDRAM.

4. The method according to claim 1, comprising jumping to entry of said loader image.

5. The method according to claim 1, comprising copying vectors to an instruction memory.

6. The method according to claim 5, comprising executing code for said loader image.

7. The method according to claim 1, comprising copying vectors from said first type of memory to an instruction memory.

8. The method according to claim 7, comprising mapping said copied vectors to a startup address.

9. The method according to claim 1, comprising copying system parameters from said first type of memory to said second type of memory.

10. The method according to claim 1, comprising jumping to start of said application code in said second type of memory.

11. The method according to claim 10, comprising initiating said execution of said copied application code from a location where said jump to start of said application code is.

12. A machine-readable storage having stored thereon, a computer program having at least one code section for efficient execution of code in memory by a processing device, the at least one code section being executable by a machine for causing the machine to perform steps comprising:
   determining whether a first type of memory is present;
   if said first type of memory is present, copying a loader image stored in said first type of memory to instruction memory;
   executing said copied loader image to copy application code from said first type of memory to a second type of memory; and
   executing said copied application code from said second type of memory, wherein said instruction memory, which stores said copied loader image, is separate from said first type of memory, which stores said loader image and said application code, and said second type of memory.

13. The machine-readable storage according to claim 12, wherein said first type of memory is a NAND flash memory.

14. The machine-readable storage according to claim 12, wherein said second type of memory is an SDRAM.

15. The machine-readable storage according to claim 12, comprising code for jumping to entry of said loader image.

16. The machine-readable storage according to claim 12, comprising code for copying vectors to an instruction memory.

17. The machine-readable storage according to claim 16, comprising code for executing said loader image.

18. The machine-readable storage according to claim 12, comprising code for copying vectors from said first type of memory to an instruction memory.

19. The machine-readable storage according to claim 18, comprising code for mapping said copied vectors to a startup address.

20. The machine-readable storage according to claim 12, comprising code for copying system parameters from said first type of memory to said second type of memory.

21. A system for efficient execution of code in memory by a processing device, the system comprising:
   at least one processor that determines whether a first type of memory is present;
   said at least one processor copies a loader image stored in said first type of memory to instruction memory, if said first type of memory is present;
   said at least one processor executes said copied loader image to copy application code from said first type of memory to a second type of memory; and
   said at least one processor executes said copied application code from said second type of memory, wherein said instruction memory, which stores said copied loader image, is separate from said first type of memory, which stores said loader image and said application code, and said second type of memory.

22. The system according to claim 21, wherein said first type of memory is a NAND flash memory.

23. The system according to claim 21, wherein said second type of memory is an SDRAM.

24. The system according to claim 21, wherein said at least one processor jumps to entry of said loader image.

25. The system according to claim 21, wherein said at least one processor copies vectors to an instruction memory.

26. The system according to claim 25, wherein said at least one processor executes code for said loader image.

27. The system according to claim 21, wherein said at least one processor copies vectors from said first type of memory to an instruction memory.

28. The system according to claim 27, wherein said at least one processor maps said copied vectors to a startup address.

29. The system according to claim 21, wherein said at least one processor copies system parameters from said first type of memory to said second type of memory.

* * * * *